(12) United States Patent
Argo (10) Patent No.: US 10,866,593 B2
(45) Date of Patent: Dec. 15, 2020

(54) AERIAL VEHICLE LANDING METHOD, GROUND CONTROL SYSTEM, AND FLIGHT CONTROL SYSTEM

(71) Applicant: AUTEL ROBOTICS CO., LTD., Guangdong (CN)

(72) Inventor: Ken Argo, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 146 days.

(21) Appl. No.: 15/710,058

(22) Filed: Sep. 20, 2017

(65) Prior Publication Data
US 2019/0088144 A1 Mar. 21, 2019

(51) Int. Cl.
| B64C 39/02 | (2006.01) |
| G05D 1/06 | (2006.01) |
| G05D 1/10 | (2006.01) |
| G08G 5/00 | (2006.01) |
| G08G 5/02 | (2006.01) |

(52) U.S. Cl.
CPC ........... *G05D 1/101* (2013.01); *B64C 39/024* (2013.01); *G05D 1/0676* (2013.01); *G05D 1/105* (2013.01); *G08G 5/0013* (2013.01); *G08G 5/0034* (2013.01); *G08G 5/0043* (2013.01); *G08G 5/0056* (2013.01); *G08G 5/0069* (2013.01); *G08G 5/025* (2013.01); *B64C 2201/141* (2013.01)

(58) Field of Classification Search
CPC ............ B64C 39/024; B64C 2201/141; G08G 5/025; G08G 5/0056; G08G 5/0034; G05D 1/105; G05D 1/0088; G05D 1/0676; G05D 1/101
USPC ........................................................ 701/122
See application file for complete search history.

(56) References Cited

U.S. PATENT DOCUMENTS

| 8,032,267 B1* | 10/2011 | Simon .................... G05D 1/106 701/4 |
| 9,257,048 B1* | 2/2016 | Offer .................... G08G 5/0039 |
| 9,310,222 B1 | 4/2016 | Suiter et al. |
| 2006/0106506 A1 | 5/2006 | Nichols et al. |
| 2007/0138345 A1* | 6/2007 | Shuster .................. G05D 1/105 244/186 |
| 2008/0154447 A1 | 6/2008 | Spinelli |
| 2015/0153740 A1* | 6/2015 | Ben-Shachar ........ B64C 39/024 701/16 |

(Continued)

OTHER PUBLICATIONS

European Search Report dated May 2, 2018; Appln. No. EP17202749.

*Primary Examiner* — Behrang Badii
*Assistant Examiner* — Hossam M Abd El Latif (57) ABSTRACT

Embodiments of the present disclosure disclose an aerial vehicle landing method, a ground control system, and a flight control system. The aerial vehicle landing method includes: selecting, when an aerial vehicle needs to make a diversion, an available alternative landing area according to at least a flight parameter of the aerial vehicle; determining the available alternative landing area as a target waypoint, and planning a new airway according to the target waypoint; and controlling, according to the new airway, the aerial vehicle to fly to the target waypoint. According to the foregoing manners, the embodiments of the present disclosure can resolve problems of unpredictable casualties and property losses that may be caused because the aerial vehicle has an emergency and is landed in a non-predetermined area.

6 Claims, 4 Drawing Sheets

---

Obtain a flight parameter that is of a drone and that exists when the drone needs to make an emergency landing — 1021

Calculate a flyable distance according to a flight parameter and an aerodynamic parameter of the drone — 1022

Select an available alternative landing area from one or more alternative landing areas according to at least the flyable distance — 1023

(56) References Cited

U.S. PATENT DOCUMENTS

2018/0364707 A1* 12/2018 Bosworth ............ A61B 5/6801
2019/0197291 A1*  6/2019 Zhu ...................... G08G 5/0021

* cited by examiner

AERIAL VEHICLE LANDING METHOD, GROUND CONTROL SYSTEM, AND FLIGHT CONTROL SYSTEM

TECHNICAL FIELD

The present disclosure relates to an aerial vehicle landing method, a ground control system, and a flight control system.

BACKGROUND OF THE DISCLOSURE

In recent years, as technologies of unmanned aerial vehicles are developed and costs thereof are reduced, fixed-wing aerial vehicles are widely applied to various fields such as military affairs, security protection, transportation, exploration, surveying and mapping, and meteorology. For example, primary links such as high-altitude military electronic and photo reconnaissance, acquisition of enemy intelligence, reconnoitering and monitoring of a local ground battlefield, short-range air patrol, an electronic warfare, a communications relay, searching and rescue after a natural disaster, a pipeline inspection, detection of an aerial cable, and aerial photography and imaging.

When the fixed-wing aerial vehicle has an emergency in flight, the fixed-wing aerial vehicles may need diversion when the fixed-wing aerial vehicles is able to fly or glide but cannot reach a planned takeoff and landing location. Because the fixed-wing aerial vehicles needs a relatively long flat runway when landing, if the fixed-wing aerial vehicles makes an emergency landing in a non-predetermined area, unpredictable casualties and property losses may be caused.

SUMMARY OF THE DISCLOSURE

In view of this, the present disclosure provides an aerial vehicle landing method, a ground control system, and a flight control system.

In view of this, the present disclosure provides an aerial vehicle landing method, including:
selecting, when an aerial vehicle needs a diversion, an available alternative landing area according to at least a flight parameter of the aerial vehicle;
determining the available alternative landing area as a target waypoint, and planning a new airway according to the target waypoint; and
controlling, according to the new airway, the aerial vehicle to fly to the target waypoint.

In some embodiments, the method further includes:
planning one or more alternative landing areas according to flight mission data of the aerial vehicle.

In some embodiments, the flight mission data includes a predetermined airway, a flight altitude, and a flight speed; and
the planning one or more alternative landing areas according to flight mission data of the aerial vehicle includes:
determining multiple waypoints according to the predetermined airway of the aerial vehicle and geomorphic information of an electronic map;
calculating, according to the flight altitude and the flight speed of the aerial vehicle, a gliding distance that is of the aerial vehicle and that exists when there is no power; and
planning the one or more alternative landing areas according to the gliding distance and with reference to digital elevation model data of the multiple waypoints.

In some embodiments, the selecting an available alternative landing area according to at least a flight parameter of the aerial vehicle includes:
obtaining the flight parameter that is of the aerial vehicle and that exists when the aerial vehicle needs a diversion;
calculating a flyable distance according to the flight parameter and an aerodynamic parameter of the aerial vehicle; and
selecting the available alternative landing area from the one or more alternative landing areas according to at least the flyable distance.

In some embodiments, the selecting the available alternative landing area from the one or more alternative landing areas according to at least the flyable distance includes:
determining optional alternative landing areas from the one or more alternative landing areas according to at least the flyable distance;
calculating to-be-flied distances from the aerial vehicle to the optional alternative landing areas;
determining priorities of all the optional alternative landing areas according to relationships between the to-be-flied distances and the flyable distance; and
selecting the available alternative landing area according to the priorities of all the optional alternative landing areas.

The planning one or more alternative landing areas according to flight mission data of the aerial vehicle is performed by a ground control system of the aerial vehicle, and optionally, the method further includes:
receiving, by the aerial vehicle, alternative landing area information uploaded by the ground control system.

In some embodiments, the method further includes:
sending, by the aerial vehicle, location information of the available alternative landing area to the ground control system.

According to a second aspect, an embodiment of the present disclosure further provides a ground control system, including:
at least one processor; and
a memory connected to the at least one processor, where the memory stores an instruction program, the at least one processor is capable of executing the instruction program, when executing the instruction program the at least one processor is configured to perform the foregoing method.

An embodiment of the present disclosure further provides a non-volatile computer readable storage medium, where the computer readable storage medium stores a computer executable instruction, and when the computer executable instruction is executed by a ground control system, the ground control system is enabled to perform the foregoing method.

An embodiment of the present disclosure further provides a computer program product, where the computer program product includes a computer program stored on a non-volatile computer readable storage medium, the computer program includes a program instruction, and when the program instruction is executed by a ground control system, the ground control system is enabled to perform the foregoing method.

According to a third aspect, an embodiment of the present disclosure further provides a flight control system, including:
at least one processor; and
a memory connected to the at least one processor, where the memory stores an instruction program, the at least one processor is capable of executing the instruction program, when executing the instruction program the at least one processor is configured to perform the foregoing method.

An embodiment of the present disclosure further provides a non-volatile computer readable storage medium, where the computer readable storage medium stores a computer executable instruction, and when the computer executable instruction is executed by a flight control system, the flight control system is enabled to perform the foregoing method.

An embodiment of the present disclosure further provides a computer program product, where the computer program product includes a computer program stored on a non-volatile computer readable storage medium, the computer program includes a program instruction, and when the program instruction is executed by a flight control system, the flight control system is enabled to perform the foregoing method.

Beneficial effects of the embodiments of the present disclosure are as follows: according to the embodiments of the present disclosure, the available alternative landing area is selected according to at least the flight parameter of the aerial vehicle when the aerial vehicle needs a diversion; problems of unpredictable casualties and property losses that may be caused because the aerial vehicle has an emergency and is landed in the non-predetermined area may be resolved; and a location in which the aerial vehicle makes an emergency landing may be learned in advance, helping manually search the aerial vehicle.

DESCRIPTION OF THE DRAWINGS

To describe the technical solutions in the embodiments of the present disclosure more clearly, the following briefly introduces the accompanying drawings required for describing the embodiments of the present disclosure. Apparently, the accompanying drawings in the following descriptions show merely some embodiments of the present disclosure, and persons of ordinary skill in the art may still derive other accompanying drawings according to these accompanying drawings without creative efforts.

DETAILED DESCRIPTION OF THE EMBODIMENTS

The following clearly describes the technical solutions of the present disclosure with reference to the accompanying drawings. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure. The term "and/or" used in the specification includes any and all combinations of one or more related listed items.

In addition, technical features related in different implementations of the present disclosure that are described below may be combined with each other if there is no conflict therebetween.

Figure 1:
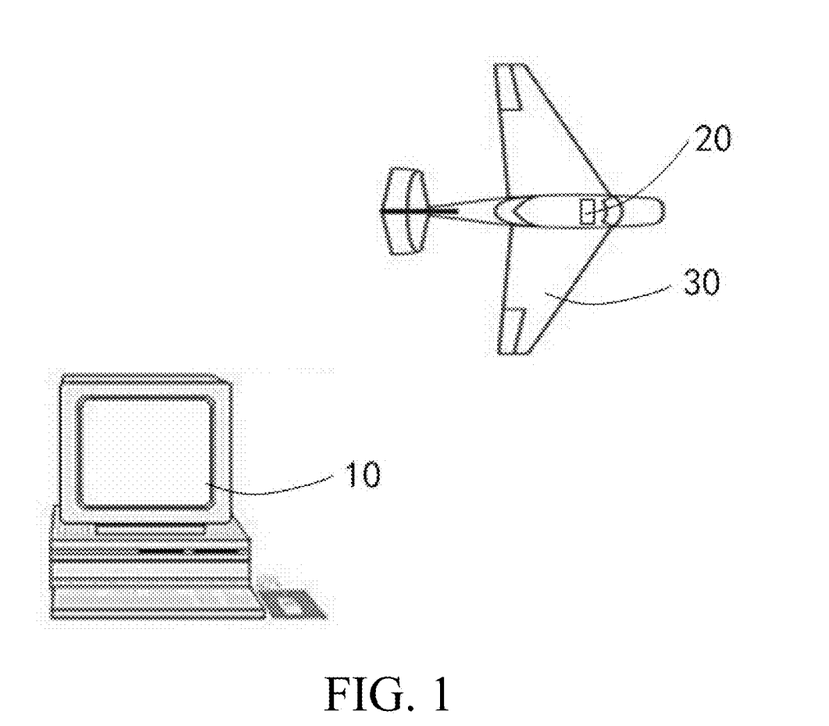
FIG. 1 is a schematic structural diagram of an implementation environment according to various embodiments of the present disclosure.

FIG. 1 is a schematic structural diagram of an implementation environment according to various embodiments of the present disclosure. As shown in FIG. 1, the implementation environment includes a ground control system 10, a flight control system 20, and an aerial vehicle 30.

The flight control system 20 is mounted on the aerial vehicle 30. The aerial vehicle 30 further includes execution mechanisms such as various airborne sensors and a control surface. The airborne sensors include, but are not limited to: a vertical gyro, an angular velocity gyro, a magnetic course meter, an atmospheric engine, a radio altimeter, a Global Positioning System (GPS), or a differential GPS. The airborne sensor is configured to collect various state information about the aerial vehicle 30 in real time, and send the various state information to the flight control system 20 and/or the ground control system 10. The ground control system 10 may be a remote controller, a computer, a mobile terminal, a mobile phone, or the like.

Data communication is performed between the flight control system 20 and the ground control system 10 by using wireless communications technologies. For example, the data communication may be performed by using an infrared technology, a data transmission station, or a radio frequency technology. The ground control system 10 edits a flight plan and uploads the flight plan to the flight control system 20. The flight control system 20 controls various control surface outputs of the aerial vehicle 30 according to the flight plan, so as to adjust a flight status of the aerial vehicle 30.

In this process, the aerial vehicle 30 may receive a control instruction of the ground control system 10 by using the flight control system 20. The flight control system 20 adjusts various control surface outputs of the aerial vehicle 30 according to the received control instruction, so as to adjust the flight status of the aerial vehicle 30.

Alternatively, the flight control system 20 generates the control instruction according to a predetermined flight airway and a flight control algorithm, so as to directly adjust the various control surface outputs of the aerial vehicle 30. Specifically, a flight control program runs in the flight control system 20, and a guidance control instruction in a vertical channel and a horizontal channel is formed according to a predetermined airway and a guidance control law and with reference to various state information collected by various airborne sensors. A guidance loop generates, according to location information and the predetermined airway of the aerial vehicle, a guidance instruction (a sliding trajectory, yawing, and lateral deviation) when the aerial vehicle is gliding downwards. A control loop serves as an inner loop of the guidance loop, and performs resolving to obtain the control instruction according to the obtained guidance instruction and the flight status (information about an altitude and an attitude) of the aerial vehicle 30.

Figure 2:
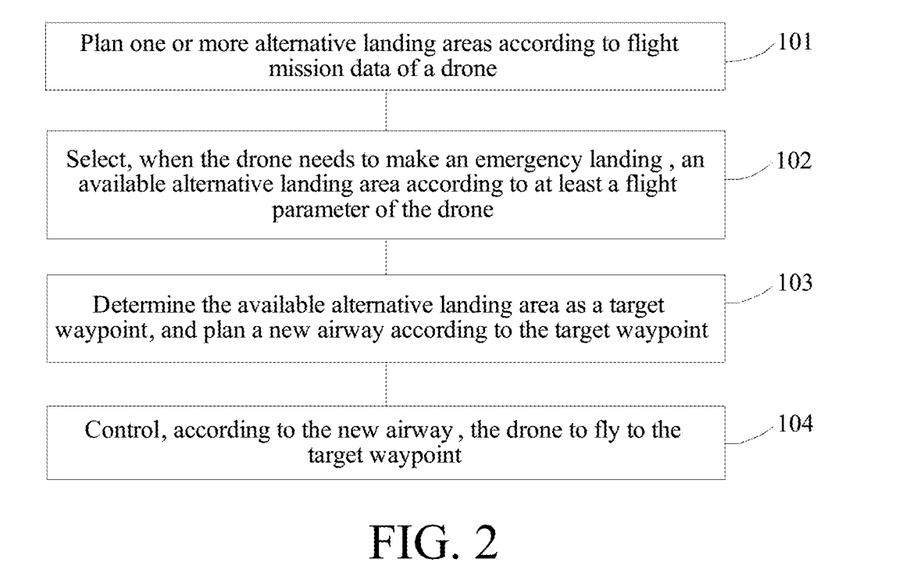
FIG. 2 is a schematic flowchart of an aerial vehicle landing method according to an embodiment of the present disclosure.

Referring to FIG. 2, FIG. 2 is a schematic flowchart of an aerial vehicle landing method provided in an embodiment of the present disclosure, including:

Step 101: Plan one or more alternative landing areas according to flight mission data of an aerial vehicle.

When the aerial vehicle patrols a road, a waterway, a railway, a petroleum pipeline, or a power line, or surveys and maps and reconnoiters according to a plan, the flight mission data is set before the aerial vehicle takes off. The flight mission data includes a predetermined airway, a flight altitude, and a flight speed.

Figure 3:
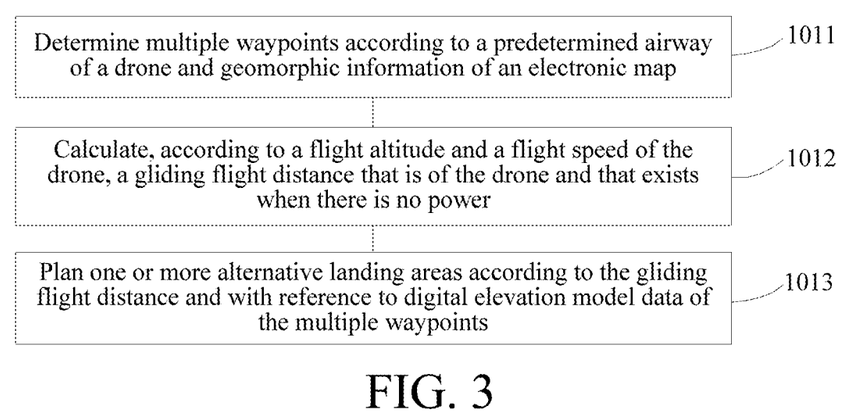
FIG. 3 is a schematic flowchart of planning one or more alternative landing areas according to flight mission data of an aerial vehicle according to an embodiment of the present disclosure.

As shown in FIG. 3, in this embodiment, the planning one or more alternative landing areas according to flight mission data of an aerial vehicle includes:

Step 1011: Determine multiple waypoints according to the predetermined airway of the aerial vehicle and geomorphic information of an electronic map.

A waypoint is an information point on an airway, and there are multiple ways to determine the waypoint. For example, a branch road of a road or a ground distinctive sign on the electronic map may be set as the waypoint; and a location point away from a fixed point for a distance may also be set as the waypoint. Only the fixed point needs to be located, and then a relative distance and a direction are input. For example, the fixed point is a takeoff location of the aerial vehicle, and location points on the airway that are away from the fixed point for two kilometers, four kilometers, six kilometers, and the like may be set as waypoints.

In this embodiment, multiple waypoints are determined according to the predetermined airway of the aerial vehicle and with reference to the geomorphic information of the electronic map. The multiple waypoints may be understood as the alternative landing areas that are preliminarily determined. After the multiple waypoints are determined, location information about the multiple waypoints is saved.

Step 1012: Calculate, according to the flight altitude and the flight speed of the aerial vehicle, a gliding distance that is of the aerial vehicle and that exists when there is no power.

That there is no power means that an engine shuts down and fails when the aerial vehicle is performing a flight mission in the air. Compared with a flight in which the engine is normal, a flight of the aerial vehicle without power has the following features: 1. the aerial vehicle cannot keep a level flight or climbout, and can merely fly to glide downwards; 2. a speed is easy to be out of control, and a flying range is limited: a thrust force of the engine is lost, and the aerial vehicle can merely regulate and control the speed by changing a component that is of the gravity force and that is in a speed direction, if the sliding trajectory is excessively flat, the speed may be continuously reduced in a flying process, and even a stall may occur; if the sliding trajectory is excessively steep, the ground cannot be touched with a safe attitude during a final landing, so that final landing safety is affected; and in addition, the altitude of the aerial vehicle with respect to the ground is limited, and therefore, a maximal distance that can be reached in flying to glide downwards is also limited; and 3. only one landing is allowed, and a go-around cannot be performed.

Now, researches show that a gliding distance $L_{min}$ that is of the aerial vehicle and that exists when there is no power is a function related to a flight altitude $\Delta H$ and a flight speed V: $L_{min}=f(\Delta H, V)$. The gliding distance $L_{min}$ that is of the aerial vehicle and that exists when there is no power may be obtained through an analog calculation and according to the specified flight altitude and flight speed of the aerial vehicle.

For a low speed aerial vehicle (the flight speed is smaller than 170 m/s), the gliding flight distance that is of the aerial vehicle and that exists when there is no power is proportional to the flight altitude and the flight speed. For example, for the aerial vehicle that has a flight altitude of 120 meters and a flight speed of 20 m/s, after the analog calculation, the gliding flight distance is 2.4 km when there is no power.

Step 1013: Plan the one or more alternative landing areas according to the gliding distance and with reference to digital elevation model data of the multiple waypoints.

According to the gliding distance $L_{min}$ that is of the aerial vehicle and that exists when there is no power, a distance between the alternative landing area and a takeoff and landing location of the aerial vehicle or between multiple alternative landing areas may be further determined. To ensure that the aerial vehicle may reach the alternative landing area when there is no power, optionally, the distance between the alternative landing area and the takeoff and landing location and/or between the multiple alternative landing areas is set to approximately two times (for example, 1.5-2.5 times) of the gliding distance $L_{min}$ that is of the aerial vehicle and that exists when there is no power. For example, the gliding distance that is of the aerial vehicle and that exists when there is no power is 2.4 km, and the distance between the alternative landing area and the takeoff and landing location or between the multiple alternative landing areas may be set to 4-5 km.

A digital elevation model (DEM) implements digital analog (that is, a digital expression of a topography surface morphology) of ground topography through limited topographical elevation data. Persons skilled in the art should understand that DEM data of the waypoint is actually DEM data of an area in which the waypoint is located.

Required DEM data may be extracted from an existing DEM library through a photographic survey, a ground survey, and digitalization of an existing topographic map.

In actual applications, the alternative landing area needs to satisfy the following requirements: 1. open: there is no building, no hill, and no river or lake; 2. no people: there are few persons; 3. plain land: the land is even and has less potholes, flat farmland, pastures, and grassland are preferential; 4. accessible: there are roads nearby, and vehicles or people can reach conveniently; and 5. feasible: it is not a military administrative zone, an airfield no-fly zone, or a special control area, and the aerial vehicle is allowed to land.

Optionally, features of the DEM data of the multiple waypoints may be extracted, and are classified and identified to obtain exact geomorphic information of the features. According to the foregoing principles for selecting the alternative landing area, the alternative landing areas are preliminarily planned in the areas in which the multiple waypoints are located.

The one or more alternative landing areas are finally planned according to a determined distance between the alternative landing area and the takeoff and landing location and/or between the multiple alternative landing areas, and the alternative landing areas that are preliminarily planned according to the DEM data of the multiple waypoints.

In other embodiments, the alternative landing areas may be preliminarily planned in the areas in which the multiple waypoints are located not only according to the DEM data of the multiple waypoints but also with reference to geomorphic parameters and parameters of surface features of the multiple waypoints on a satellite map. Alternatively, the alternative landing areas are first preliminarily planned according to the DEM data of the multiple waypoints and according to the foregoing principles for selecting the alternative landing area. Subsequently, one or more alternative landing areas are planned according to the determined distance between the alternative landing area and the takeoff and landing location or between the multiple alternative landing areas, and according to geomorphic parameters and parameters of surface features of the alternative landing areas that are preliminarily planned on the satellite map.

In the foregoing embodiments, a field survey may further be performed in the preliminarily planned alternative landing areas, and the one or more alternative landing areas are finally planned according to a field survey result.

It should be noted that the one or more alternative landing areas may be planned according to the flight mission data of the aerial vehicle before the aerial vehicle takes off or in a flying process of the aerial vehicle, which is not limited in the embodiments of the present disclosure.

Step 102: Select, when the aerial vehicle needs a diversion, an available alternative landing area according to at least a flight parameter of the aerial vehicle.

In a flying process of the aerial vehicle, flight parameters such as an altitude, a speed, a flight direction, or an attitude angle of the aerial vehicle may be obtained in real time by using various airborne sensors. When the aerial vehicle has an emergency, and is able to fly but cannot reach a planned takeoff and landing location, the aerial vehicle needs to select an alternative landing area to make a diversion. For example, when it is detected that the aerial vehicle has insufficient power, or the wind is excessively strong, or a destination is performed with flight control, or an emergency landing instruction of a user is received, a diversion needs to be made.

Figure 4:
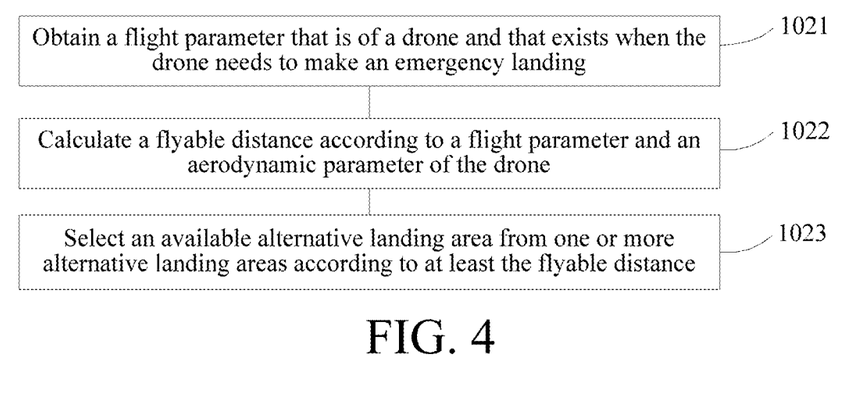
FIG. 4 is a schematic flowchart of selecting an available alternative landing area according to at least a flight parameter of an aerial vehicle according to an embodiment of the present disclosure.

As shown in FIG. 4, the selecting an available alternative landing area according to at least a flight parameter of the aerial vehicle includes:

Step 1021: Obtain the flight parameter that is of the aerial vehicle and that exists when the aerial vehicle needs to make a diversion.

The flight parameter includes a current location, an electricity amount/a fuel capacity, an altitude, a speed, a flight direction, an attitude angle, or an angle of incidence.

Step 1022: Calculate a flyable distance according to the flight parameter and an aerodynamic parameter of the aerial vehicle.

Controllability and stability of the aerial vehicle are both related to an aerodynamic property of the aerial vehicle and an efficiency of control of a control surface. The aerodynamic property of the aerial vehicle and the efficiency of control of the control surface are not affected regardless of whether the engine shuts down and fails. In actual applications, an actual aerodynamic property of the aerial vehicle mainly includes a lift coefficient, a drag coefficient, a pitching-moment coefficient, and a changing relationship between a lift-over-drag coefficient and the angle of incidence. Therefore, in this embodiment, the aerodynamic parameter mainly includes a lift coefficient, a drag coefficient, a pitching-moment coefficient, and a lift-over-drag coefficient.

According to the flight parameter and the aerodynamic parameter of the aerial vehicle, a lift force, a drag force, a pitching moment, and an elevator efficiency of the aerial vehicle may be calculated. A flyable distance $L_{max}$ that exists when the aerial vehicle needs to make a diversion may further be calculated according to the foregoing data.

Step 1023: Select the available alternative landing area from the one or more alternative landing areas according to at least the flyable distance.

Theoretically, alternative landing areas in an area that uses the current location as a circle center and uses the flyable distance $L_{max}$ as a radius may be all optional alternative landing areas. However, when the aerial vehicle makes a diversion, a part of energy needs to be remained to overcome an error brought in by aerodynamic uncertainty of the aerial vehicle and interference from an unknown external environment. Therefore, after the optional alternative landing areas are determined according to the flyable distance, to-be-flied distances $L_{act}$ from the aerial vehicle to the optional alternative landing areas need to be accurately calculated. The flyable distance $L_{max}$ is compared with the to-be-flied distances $L_{act}$ to remain a part of the energy for the flyable distance $L_{max}$.

Optionally, priorities are set to all available alternative landing areas according to relationships between the flyable distance $L_{max}$ and the to-be-flied distances $L_{act}$. For example, when $L_{act}<0.5\ L_{max}$, the priority set for the available alternative landing area is level 2; when $0.5\ L_{max} \leq L_{act} \leq 0.8\ L_{max}$, the priority set for the available alternative landing area is level 1 (the highest level); and when $L_{act} \geq 0.8\ L_{max}$, the priority set for the available alternative landing area is level 3. According to the priorities of all the available alternative landing areas, an available alternative landing area is selected in descending order of the priorities.

Step 103: Determine the available alternative landing area as a target waypoint, and plan a new airway according to the target waypoint.

Planning the new airway according to the target waypoint is the prior art and would be easily understood by persons skilled in the art, and details are not described herein again.

Step 104: Control, according to the new airway, the aerial vehicle to fly to the target waypoint.

A ground control system calculates to obtain a control instruction according to the new airway, and uploads the control instruction to a flight control system of the aerial vehicle, so that the flight control system adjusts the flight direction, the attitude angle, or the speed of the aerial vehicle according to the control instruction, so as to control the aerial vehicle to land at the target waypoint.

In this embodiment, the available alternative landing area is selected according to at least the flight parameter of the aerial vehicle when the aerial vehicle needs to make a diversion; problems of unpredictable casualties and property losses that may be caused because the aerial vehicle has an emergency and is landed in a non-predetermined area can be resolved; and a location in which the aerial vehicle makes a diversion may be learned in advance, helping manually search the aerial vehicle.

Figure 5:
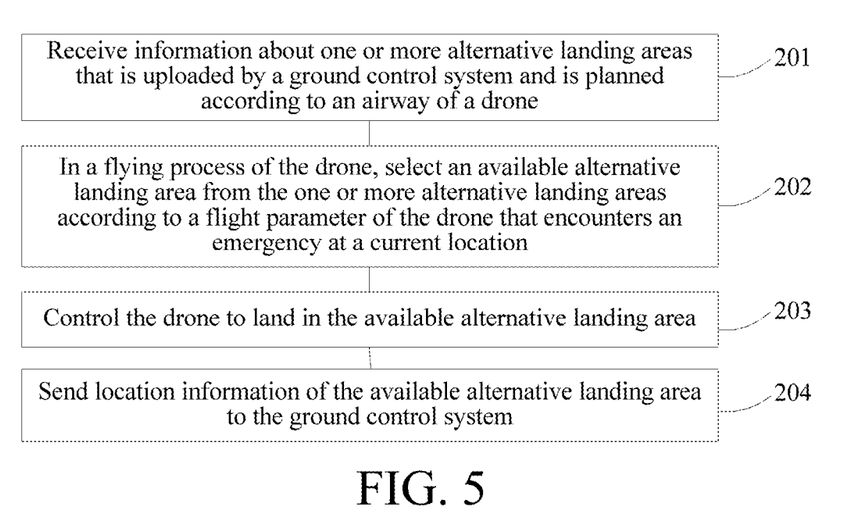
FIG. 5 is a schematic flowchart of an aerial vehicle landing method according to another embodiment of the present disclosure.

Referring to FIG. 5, FIG. 5 is a schematic flowchart of an aerial vehicle landing method provided in another embodiment of the present disclosure, including:

Step 201: Receive alternative landing area information uploaded by a ground control system.

The alternative landing area information is obtained according to flight mission data of an aerial vehicle, and includes a geographic coordinate of an alternative landing area. To ensure that the aerial vehicle can also reach the alternative landing area when there is no power, specifically, the alternative landing area information is obtained according to a gliding distance that exists when the aerial vehicle has no power and with reference to DEM data of multiple waypoints.

Step 202: Select, when the aerial vehicle needs to make a diversion, an available alternative landing area according to at least a flight parameter of the aerial vehicle.

Step 203: Determine the available alternative landing area as a target waypoint, and plan a new airway according to the target waypoint.

Step 204: Control, according to the new airway, the aerial vehicle to fly to the target waypoint.

For steps 202 to 204, reference may be made to related steps in the forgoing embodiment. Different from the foregoing embodiment, steps 202 to 204 are performed by a flight control system. That is, the flight control system may directly select the available alternative landing area according to at least the flight parameter of the aerial vehicle when the aerial vehicle needs to make a diversion, plan the new airway according to the target waypoint, and calculate to obtain a control instruction according to the new airway.

Optionally, in other embodiments of the method, the method further includes:

Step 205: Send location information of the available alternative landing area to the ground control system.

Generally, if the aerial vehicle needs to make a diversion due to a sudden failure, go-around cannot be performed after the emergency landing. To help manually search the aerial vehicle, after the available alternative landing area is selected, the flight control system sends the location information of the available alternative landing area to the ground control system.

It should be noted that step 203 and step 205 may be performed in any sequence. Step 203 and step 205 may be performed at the same time; or step 205 may be first performed, and step 203 is subsequently performed.

In this embodiment, through receiving the alternative landing area information uploaded by the ground control system, the available alternative landing area is selected according to at least the flight parameter of the aerial vehicle when the aerial vehicle needs to make a diversion; problems of unpredictable casualties and property losses that may be caused because the aerial vehicle has an emergency and is landed in a non-predetermined area can be resolved; and a location in which the aerial vehicle makes a diversion may be learned by the ground control system in advance, helping manually search the aerial vehicle.

Figure 6:
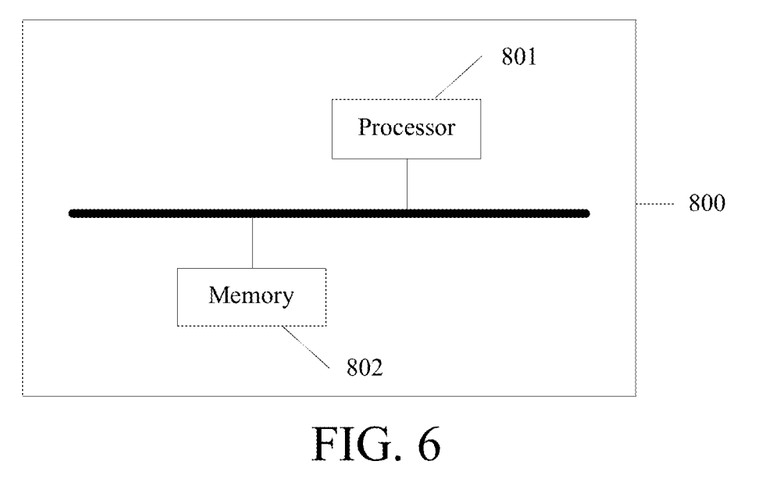
FIG. 6 is a schematic structural diagram of a ground control system according to an embodiment of the present disclosure.

FIG. 6 is a schematic structural diagram of a ground control system 800 provided in an embodiment of the present disclosure. As shown in FIG. 6, the ground control system 800 includes one or more processors 801 and a memory 802. One processor 801 is used as an example in FIG. 6.

The processor 801 may be connected to the memory 802 by using a bus or in other manners. The processor 801 being connected to the memory 802 by using a bus is used as an example in FIG. 6.

The memory 802 is a non-volatile computer readable storage medium, and may be configured to store a non-volatile software program, a non-volatile computer executable program, and a module, for example, a program instruction/module corresponding to the aerial vehicle emergency landing method in the embodiments of the present disclosure. The processor 801 operates the non-volatile software program, the instruction, and the module that are stored in the memory 802, so as to perform various function applications of an aerial vehicle emergency landing device and data processing, that is, implement the aerial vehicle emergency landing method in the foregoing method embodiments and functions of various modules in the foregoing device embodiments.

The memory 802 may further include a high speed random access memory, and may also include a non-volatile memory such as at least one magnetic disk storage device, a flash memory, or another non-volatile solid-state storage device. In embodiments, the memory 802 optionally includes memories that are remotely disposed relative to the processor 801. These remote memories may be connected to the processor 801 through a network. Examples of the network include, but are not limited to, Internet, an intranet, a local area network, a mobile communications network, and a combination thereof.

The program instruction/module is stored in the memory 802. When the program instruction/module is executed by the one or more processors 801, the aerial vehicle landing method in any of the foregoing method embodiments is performed. For example, steps shown in FIG. 2 to FIG. 4 described above are performed.

In this embodiment, an available alternative landing area is selected by the ground control system according to at least a flight parameter of the aerial vehicle when the aerial vehicle needs to make a diversion; problems of unexpected casualties and property losses that may be caused because the aerial vehicle has an emergency and is landed in a non-predetermined area can be resolved; and a location in which the aerial vehicle makes a diversion may be learned in advance, helping manually search the aerial vehicle.

Embodiments of the present disclosure further provide a non-volatile computer storage medium. The computer storage medium stores a computer executable instruction. The computer executable instruction is executed by one or more processors, for example, one processor 801 in FIG. 6. Therefore, the one or more processors may be enabled to perform the aerial vehicle emergency landing method in any of the foregoing method embodiments. For example, steps shown in FIG. 2 to FIG. 4 described above are performed.

The foregoing product may perform the method provided in the embodiments of the present disclosure, and has corresponding functional modules for implementing the method and has beneficial effects. Technical details are not described in detail in this embodiment, and reference may be made to the method provided in the embodiments of the present disclosure.

To better achieve the foregoing objectives, an embodiment of the present disclosure further provides a flight control system. The flight control system stores an executable instruction. The executable instruction may perform the aerial vehicle landing method in any of the foregoing method embodiments.

Figure 7:
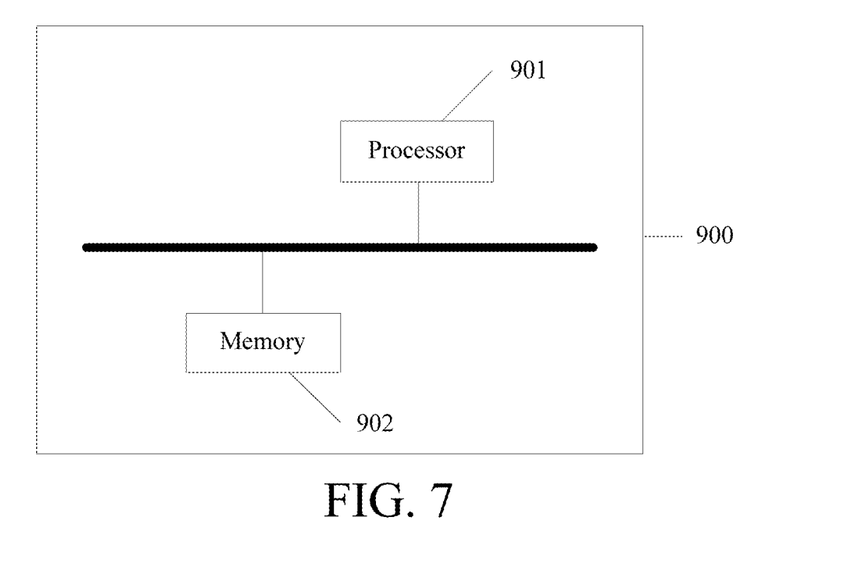
FIG. 7 is a schematic structural diagram of a flight control system according to an embodiment of the present disclosure.

FIG. 7 is a schematic structural diagram of a flight control system 900 provided in an embodiment of the present disclosure. As shown in FIG. 7, the flight control system 900 includes one or more processors 901 and a memory 902. One processor 901 is used as an example in FIG. 7.

The processor 901 may be connected to the memory 902 by using a bus or in other manners. The processor 901 being connected to the memory 902 by using a bus is used as an example in FIG. 7.

The memory 902 is a non-volatile computer readable storage medium, and may be configured to store a non-volatile software program, a non-volatile computer executable program, and a module, for example, a program instruction/module corresponding to the aerial vehicle emergency landing method in the embodiments of the present disclosure. The processor 901 operates the non-volatile software program, the instruction, and the module that are stored in the memory 902, so as to perform various function applications of an aerial vehicle emergency landing device and data processing, that is, implement the aerial vehicle landing method in the foregoing method embodiments.

The memory 902 may further include a high speed random access memory, and may also include a non-volatile memory such as at least one magnetic disk storage device, a flash memory, or another non-volatile solid-state storage device.

The program instruction/module is stored in the memory 902. When the program instruction/module is executed by the one or more processors 901, the aerial vehicle landing method in any of the foregoing method embodiments is performed. For example, steps shown in FIG. 5 described above are performed.

In this embodiment, through receiving alternative landing area information uploaded by a ground control system, an available alternative landing area is selected by the flight control system according to at least a flight parameter of the aerial vehicle when the aerial vehicle needs to make a diversion; problems of unexpected casualties and property losses that may be caused because the aerial vehicle has an emergency and is landed in a non-predetermined area can be resolved; and a location in which the aerial vehicle makes a diversion may be learned by the ground control system in advance, helping manually search the aerial vehicle.

Embodiments of the present disclosure further provide a non-volatile computer storage medium. The computer storage medium stores a computer executable instruction. The computer executable instruction is executed by one or more processors, for example, one processor 901 in FIG. 7. Therefore, the one or more processors may be enabled to perform the aerial vehicle landing method in any of the foregoing method embodiments. For example, steps shown in FIG. 5 described above are performed.

The foregoing product may perform the method provided in the embodiments of the present disclosure, and has corresponding functional modules for implementing the method and has beneficial effects. Technical details are not described in detail in this embodiment, and reference may be made to the method provided in the embodiments of the present disclosure.

The described device embodiments are merely exemplary. The units described as separate parts may or may not be physically separate, and parts displayed as units may or may not be physical units, may be located in one location, or may be distributed on multiple network units. Some or all of the modules may be selected according to actual requirements to achieve the objectives of the solutions of the embodiments.

Based on the foregoing descriptions of the embodiments, persons skilled in the art may clearly understand that the embodiments may be implemented by software in addition to universal hardware platform, or by hardware only. Based on such an understanding, the technical solutions essentially or the part contributing to the prior art may be implemented in a form of a software product. The computer software product may be stored in a computer readable storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments.

Finally, it should be noted that the foregoing embodiments are merely intended for describing the technical solutions of the present disclosure, but not for limiting the present disclosure. Under the concept of the present disclosure, the foregoing embodiments or the technical features of different embodiments may be combined, steps may be implemented in any order, and there are many other variations in different aspects of the present disclosure that are described above. For brevity, these variations are provided in detail. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. An aerial vehicle landing method, comprising:
selecting, when an aerial vehicle needs to make a diversion, an available alternative landing area according to at least a flight parameter of the aerial vehicle;
determining the available alternative landing area as a target waypoint, and planning a new airway according to the target waypoint; and
controlling, according to the new airway, the aerial vehicle to fly to the target waypoint;
wherein the selecting the available alternative landing area according to at least the flight parameter of the aerial vehicle comprises:
obtaining the flight parameter that is of the aerial vehicle and that exists when the aerial vehicle needs to make a diversion;
calculating a flyable distance according to the flight parameter and an aerodynamic parameter of the aerial vehicle; and
selecting the available alternative landing area from one or more alternative landing areas according to at least the flyable distance;
wherein the selecting the available alternative landing area from the one or more alternative landing areas according to at least the flyable distance comprises:
determining optional alternative landing areas from the one or more alternative landing areas according to at least the flyable distance;
calculating to-be-flied distances from the aerial vehicle to the optional alternative landing areas;
determining priorities of all the optional alternative landing areas based on relationships between the to-be-flied distances and the flyable distance; and
selecting the available alternative landing area according to the priorities of all the optional alternative landing areas;
wherein the method further comprises:
planning the one or more alternative landing areas according to flight mission data of the aerial vehicle;
wherein the flight mission data comprises a predetermined airway, a flight altitude, and a flight speed;
wherein the planning the one or more alternative landing areas according to flight mission data of the aerial vehicle comprises:
determining multiple waypoints according to the predetermined airway of the aerial vehicle and geomorphic information of an electronic map;
calculating, according to the flight altitude and the flight speed of the aerial vehicle, a gliding distance that is of the aerial vehicle and that exists when there is no power; and
planning the one or more alternative landing areas according to the gliding distance and with reference to digital elevation model data of the multiple waypoints;
wherein distance between landing areas of the one or more alternative landing areas is set to 1.5-2.5 times of the gliding distance.

2. An aerial vehicle landing method, comprising:
selecting, when an aerial vehicle needs to make a diversion, an available alternative landing area according to at least a flight parameter of the aerial vehicle;
determining the available alternative landing area as a target waypoint, and planning a new airway according to the target waypoint; and
controlling, according to the new airway, the aerial vehicle to fly to the target waypoint;
wherein the selecting the available alternative landing area according to at least the flight parameter of the aerial vehicle comprises:
obtaining the flight parameter that is of the aerial vehicle and that exists when the aerial vehicle needs to make a diversion;
calculating a flyable distance according to the flight parameter and an aerodynamic parameter of the aerial vehicle; and
selecting the available alternative landing area from one or more alternative landing areas according to at least the flyable distance;
wherein the selecting the available alternative landing area from the one or more alternative landing areas according to at least the flyable distance comprises:
determining optional alternative landing areas from the one or more alternative landing areas according to at least the flyable distance;
calculating to-be-flied distances from the aerial vehicle to the optional alternative landing areas;
determining priorities of all the optional alternative landing areas based on relationships between the to-be-flied distances and the flyable distance; and
selecting the available alternative landing area according to the priorities of all the optional alternative landing areas;
wherein when the to-be-flied distances is not less than half of the flyable distance and not greater than 0.8 times of the flyable distance, a priority of a corresponding available alternative landing area is the highest.

3. A ground control system, comprising:
at least one processor; and
a memory connected to the at least one processor;
wherein the memory stores an instruction program, the at least one processor is capable of executing the instruction program, and when executing the instruction program the at least one processor is configured to:
select, when an aerial vehicle needs to make a diversion, an available alternative landing area according to at least a flight parameter of the aerial vehicle;
determine, the available alternative landing area as a target waypoint, and planning a new airway according to the target waypoint; and
control, according to the new airway, the aerial vehicle to fly to the target waypoint;
wherein the at least one processor is specifically configured to:
obtain the flight parameter that is of the aerial vehicle and that exists when the aerial vehicle needs to make a diversion;
calculate a flyable distance according to the flight parameter and an aerodynamic parameter of the aerial vehicle; and
select the available alternative landing area from one or more alternative landing areas according to at least the flyable distance;
wherein the at least one processor is specifically configured to:
determine optional alternative landing areas from the one or more alternative landing areas according to at least the flyable distance;
calculate to-be-flied distances from the aerial vehicle to the optional alternative landing areas;
determine priorities of all the optional alternative landing areas according to relationships between the to-be-flied distances and the flyable distance; and
select the available alternative landing area according to the priorities of all the optional alternative landing areas, wherein the at least one processor is further configured to plan one or more alternative landing areas according to flight mission data of the aerial vehicle, wherein the flight mission data comprises a predetermined airway, a flight altitude, and a flight speed; and the at least one processor is configured to:
determine, multiple waypoints according to the predetermined airway of the aerial vehicle and geomorphic information of an electronic map;
calculate, according to the flight altitude and the flight speed of the aerial vehicle, a gliding distance that is of the aerial vehicle and that exists when there is no power; and
plan the one or more alternative landing areas according to the gliding distance and with reference to digital elevation model data of the multiple waypoints, wherein distance between landing areas of the one or more alternative landing areas is set to 1.5-2.5 times of the gliding distance.

4. A ground control system, comprising:
at least one processor; and
a memory connected to the at least one processor;
wherein the memory stores an instruction program, the at least one processor is capable of executing the instruction program, and when executing the instruction program the at least one processor is configured to:
select, when an aerial vehicle needs to make a diversion, an available alternative landing area according to at least a flight parameter of the aerial vehicle;
determine, the available alternative landing area as a target waypoint, and planning a new airway according to the target waypoint; and
control, according to the new airway, the aerial vehicle to fly to the target waypoint;
wherein the at least one processor is specifically configured to:
obtain the flight parameter that is of the aerial vehicle and that exists when the aerial vehicle needs to make a diversion;
calculate a flyable distance according to the flight parameter and an aerodynamic parameter of the aerial vehicle; and
select the available alternative landing area from one or more alternative landing areas according to at least the flyable distance;
wherein the at least one processor is specifically configured to:
determine optional alternative landing areas from the one or more alternative landing areas according to at least the flyable distance;
calculate to-be-flied distances from the aerial vehicle to the optional alternative landing areas;
determine priorities of all the optional alternative landing areas according to relationships between the to-be-flied distances and the flyable distance; and select the available alternative landing area according to the priorities of all the optional alternative landing areas, wherein when the to-be-flied distances is not less than half of the flyable distance and not greater than 0.8 times of the flyable distance, a priority of a corresponding available alternative landing area is the highest.

5. A flight control system, comprising:
at least one processor; and
a memory connected to the at least one processor, wherein the memory stores an instruction program, the at least one processor is capable of executing the instruction program, when executing the instruction program the at least one processor is configured to:
select, when an aerial vehicle needs to make a diversion, an available alternative landing area according to at least a flight parameter of the aerial vehicle;
determine, the available alternative landing area as a target waypoint, and planning a new airway according to the target waypoint; and
control, according to the new airway, the aerial vehicle to fly to the target waypoint;
wherein the at least one processor is specifically configured to:
obtain the flight parameter that is of the aerial vehicle and that exists when the aerial vehicle needs to make a diversion;
calculate a flyable distance according to the flight parameter and an aerodynamic parameter of the aerial vehicle; and
select the available alternative landing area from one or more alternative landing areas according to at least the flyable distance;
wherein the at least one processor is specifically configured to:
determine optional alternative landing areas from the one or more alternative landing areas according to at least the flyable distance;
calculate to-be-flied distances from the aerial vehicle to the optional alternative landing areas;
determine priorities of all the optional alternative landing areas according to relationships between the to-be-flied distances and the flyable distance; and
select the available alternative landing area according to the priorities of all the optional alternative landing areas, wherein the at least one processor is further configured to plan one or more alternative landing areas according to flight mission data of the aerial vehicle, wherein the flight mission data comprises a predetermined airway, a flight altitude, and a flight speed; and
the at least one processor is configured to:
determine multiple waypoints according to the predetermined airway of the aerial vehicle and geomorphic information of an electronic map;
calculate, according to the flight altitude and the flight speed of the aerial vehicle, a gliding distance that is of the aerial vehicle and that exists when there is no power; and
plan the one or more alternative landing areas according to the gliding distance and with reference to digital elevation model data of the multiple waypoints, wherein distance between landing areas of the one or more alternative landing areas is set to 1.5-2.5 times of the gliding distance.

6. A flight control system, comprising:
at least one processor; and
a memory connected to the at least one processor, wherein the memory stores an instruction program, the at least one processor is capable of executing the instruction program, when executing the instruction program the at least one processor is configured to:
select, when an aerial vehicle needs to make a diversion, an available alternative landing area according to at least a flight parameter of the aerial vehicle;
determine, the available alternative landing area as a target waypoint, and planning a new airway according to the target waypoint; and
control, according to the new airway, the aerial vehicle to fly to the target waypoint;
wherein the at least one processor is specifically configured to:
obtain the flight parameter that is of the aerial vehicle and that exists when the aerial vehicle needs to make a diversion;
calculate a flyable distance according to the flight parameter and an aerodynamic parameter of the aerial vehicle; and
select the available alternative landing area from one or more alternative landing areas according to at least the flyable distance;
wherein the at least one processor is specifically configured to:
determine optional alternative landing areas from the one or more alternative landing areas according to at least the flyable distance;
calculate to-be-flied distances from the aerial vehicle to the optional alternative landing areas;
determine priorities of all the optional alternative landing areas according to relationships between the to-be-flied distances and the flyable distance; and
select the available alternative landing area according to the priorities of all the optional alternative landing areas,
wherein when the to-be-flied distances is not less than half of the flyable distance and not greater than 0.8 times of the flyable distance, a priority of a corresponding available alternative landing area is the highest.

* * * * *